United States Patent
Bei et al.

(10) Patent No.: US 10,929,619 B2
(45) Date of Patent: Feb. 23, 2021

(54) NUMERICAL GENERALIZATION METHOD FOR MACHINE TRANSLATION AND SYSTEM, COMPUTER AND COMPUTER PROGRAM THEREOF

(71) Applicant: Glabal Tone Communication Technology Co., Ltd., Beijing (CN)

(72) Inventors: Chao Bei, Beijing (CN); Guogen Cheng, Beijing (CN)

(73) Assignee: GLABAL TONE COMMUNICATION TECHNOLOGY CO., LTD., Beijing (CN)

( * ) Notice: Subject to any disclaimer, the term of this patent is extended or adjusted under 35 U.S.C. 154(b) by 143 days.

(21) Appl. No.: 16/315,655

(22) PCT Filed: Dec. 12, 2017

(86) PCT No.: PCT/CN2017/115691
§ 371 (c)(1),
(2) Date: Jan. 7, 2019

(87) PCT Pub. No.: WO2019/113783
PCT Pub. Date: Jun. 20, 2019

(65) Prior Publication Data
US 2020/0302125 A1    Sep. 24, 2020

(30) Foreign Application Priority Data
Dec. 11, 2017  (CN) .......................... 201711309873.0

(51) Int. Cl.
*G06F 40/30*      (2020.01)
*G06F 40/58*      (2020.01)
(Continued)

(52) U.S. Cl.
CPC ............ *G06F 40/58* (2020.01); *G06F 40/289* (2020.01); *G06F 40/30* (2020.01); *G06N 3/08* (2013.01)

(58) Field of Classification Search
CPC ............................... G06F 40/58; G06F 40/279
See application file for complete search history.

(56) References Cited

U.S. PATENT DOCUMENTS

| | | | |
|---|---|---|---|
| 2006/0200339 A1* | 9/2006 | Satake | G06F 40/58 704/4 |
| 2010/0179803 A1* | 7/2010 | Sawaf | G06F 40/40 704/2 |

(Continued)

FOREIGN PATENT DOCUMENTS

| | | |
|---|---|---|
| CN | 105068998 A | 11/2015 |
| CN | 106663092 A | 5/2017 |

(Continued)

*Primary Examiner* — Jialong He
(74) *Attorney, Agent, or Firm* — Bayramoglu Law Offices LLC

(57) ABSTRACT

A numerical generalization method for machine translation and system, computer and computer program thereof includes a training stage, in the training stage, a training corpus is processed in a special manner, and a normal training is performed without changing a structure of a neural network model; and a translation stage, in the translation stage, a generalization label in a translation is replaced with a normal translation. In the present invention, only the pre-processing and post-processing are changed to make the generalization technology applicable, which expands the application of the generalization technology in a neural network machine translation, and better adapts to the new machine translation model structure.

7 Claims, 1 Drawing Sheet

---

S101 — Training stage, during which a word finding is performed after a word segmentation, a word alignment is performed and a word or a phrase containing a number is replaced with a label, then a normal training is performed S102 — Translation stage, during which a word finding is performed, the number is replaced with a label and a translation is proceeded, and the label is replaced back to a translation

(51) Int. Cl.
*G06F 40/289* (2020.01)
*G06N 3/08* (2006.01)

(56) References Cited

U.S. PATENT DOCUMENTS

| | | | |
|---|---|---|---|
| 2014/0163951 A1* | 6/2014 | Nikoulina | G06F 40/295 |
| | | | 704/4 |
| 2016/0117316 A1* | 4/2016 | Le | G06F 7/10 |
| | | | 704/9 |
| 2017/0323203 A1 | 11/2017 | Matusov et al. | |
| 2019/0087417 A1* | 3/2019 | Wang | G06F 40/53 |

FOREIGN PATENT DOCUMENTS

| CN | 106815215 A | 6/2017 |
|---|---|---|
| CN | 107329960 A | 11/2017 |

* cited by examiner

NUMERICAL GENERALIZATION METHOD FOR MACHINE TRANSLATION AND SYSTEM, COMPUTER AND COMPUTER PROGRAM THEREOF

CROSS REFERENCE TO RELATED APPLICATIONS

This application is the national phase entry of International Application PCT/CN2017/115691, filed on Dec. 12, 2017 which is based upon and claims priority to Chinese Patent Application No. 201711309873.0, filed on Dec. 11, 2017 the entire contents of which are incorporated herein by reference.

TECHNICAL FIELD

The present invention pertains to the technical field of computer software, particularly to a numerical generalization method for machine translation and system, computer and computer program thereof.

BACKGROUND

Machine translation is the process of translating one natural language into another using machine learning techniques. As an important branch of computational linguistics, machine translation involving disciplines such as cognitive science, linguistics etc. is one of the ultimate goals of artificial intelligence. Different from phrase-based statistical machine translation, existing machine translation is mainly the neural network machine translation based on attention mechanism and encoder-decoder framework. The disadvantage of neural network machine translation is that it has difficulty in controlling the content, and the output of the model is difficult to control artificially. One of the most obvious problems lies in the number translation error, that is, numbers are inconsistent between the original text and translation or are missed or added in translation. However, it is difficult to control the numerical translation problem in the model, and it is also difficult to make up for the errors in the translation by post-processing. Therefore, to avoid this simple numerical translation problem and further improve the quality of translation is an urgent but difficult problem to solve. In neural network machine translation, digital generalization technology can neither specify the label not to be translated nor replace with the original text, which is caused by the poor controllability of neural network model.

To sum up, the technical problems of the prior art are as follows: the current neural network model has difficulty in controlling the content; the output of the model is hard to control, artificially; and numbers are inconsistent between the original text and translation, or there is a problem of missing or adding translations.

SUMMARY

In view of the technical problems of the prior art, a numerical generalization method for machine translation and system, computer and computer program thereof is provided by the present invention.

The present invention is realized as follows: a numerical generalization method for machine translation, wherein the numerical generalization method for machine translation includes: a training stage, wherein in the training stage, a training corpus is processed in a special manner, and a normal training is performed without changing a structure of a neural network model; and a translation stage, wherein in the translation stage, a generalization label in a translation is replaced with a normal translation.

Furthermore, the training stage includes:
(1) applying a word segmentation algorithm based on a hidden Markov model on a corpus to perform a normal word segmentation, and finding a word or a phrase containing a number by a regular expression according to different languages;
(2) performing a word alignment, counting a total frequency of word pairs in a bilingual corpus, finding a corresponding translation of the word or the phrase containing the number, and replacing the word or the phrase containing the number with a number label;
(3) normally training a corpus being processed by replacing the word or the phrase containing the number with a numerical generalization label.

Furthermore, the translation stage includes:
(1) replacing the word or the phrase containing the number found by performing the word segmentation on an original text with the numerical generalization label;
(2) translating a generalized original text by a neural network model trained by a generalized corpus;
(3) after a translation is obtained, finding an original text corresponding to the numerical generalization label in the translation through attention information in the neural network model, and replacing the numerical generalization label with the translation according to word pair information obtained by a tool of the word alignment used in the training stage to obtain a final translation.

Another objective of the present invention is to provide a numerical generalization system for machine translation of the numerical generalization method for machine translation. The numerical generalization system for machine translation includes:
a training module, configured to process a training corpus in a special manner; and
a translation module, configured to replace a generalization label in a translation with a normal translation.

The training module further includes:
a first word-finding unit, configured to find a word or a phrase containing a number;
a first replacement unit, configured to provide parallel corpora of a word or a phrase containing the number as a replacement translation for the translation stage;
a training unit, configured to normally train a corpus being processed by replacing the word or the phrase containing the number with a numerical generalization label.

The translation module further includes:
a second word-finding unit, configured to process an original text in a way similar to a processing of the training corpus, and replace the word or the phrase containing the number with the generalization label to have a format consistent with a format of the training corpus;
a second replacement unit, configured to translate a generalized original text; and
a translation replacement unit, configured to replace the numerical generalization label in a translation to obtain a normal translation.

Another objective of the present invention is to provide a computer program for implementing the numerical generalization method for machine translation.

Another objective of the present invention is to provide a computer running the computer program.

Yet, another purpose of the present invention is to provide a computer readable storage medium, including instructions, which enable the computer to perform the numerical generalization method for machine translation while the instructions are running on the computer.

The present invention extends the application of generalization technology in neural network machine translation. In phrase-based statistical machine translation, the model can be directly interfered with, while the neural network model cannot use the same strategy. With the situation that the neural network model is difficult to be artificially interfered with, the generalization technology can be applied only by changing the pre-processing and post-processing without changing the neural network machine translation model, which expands the application of generalization technology in neural network machine translation and better adapts to the new machine translation model structure. Thus, not only can the word or phrase containing numbers be translated more accurately, but also the numbers in the word list can be replaced with generalization labels, which reduces the size of the word list and improves the training efficiency of neural network model.

In the figure: 1 is the training module; 1-1 is the first word-finding unit; 1-2 is the first replacement unit; 1-3 is the training unit; 2 is the translation module; 2-1 is the second word-finding unit; 2-2 is the second replacement unit; 2-3 is the translation replacement unit.

DETAILED DESCRIPTION OF THE EMBODIMENTS

In order to make the objective, technical solution and advantages of the present invention clearer, the present invention will be further described in detail in combination of the embodiments, hereinafter. It shall be understood that the specific embodiments described herein are used only to explain the present invention rather than limit the present invention.

The numerical generalization of the present invention can ease the above-mentioned problems simply but effectively. It can not only translate the word or phrase containing numbers more accurately, but also reduce the size of the word list, so that the numbers in the word list are all replaced with the generalization labels, thereby improving the efficiency of training The application principle of the present invention is described in detail in combination with the drawings, hereinafter.

Figure 1:
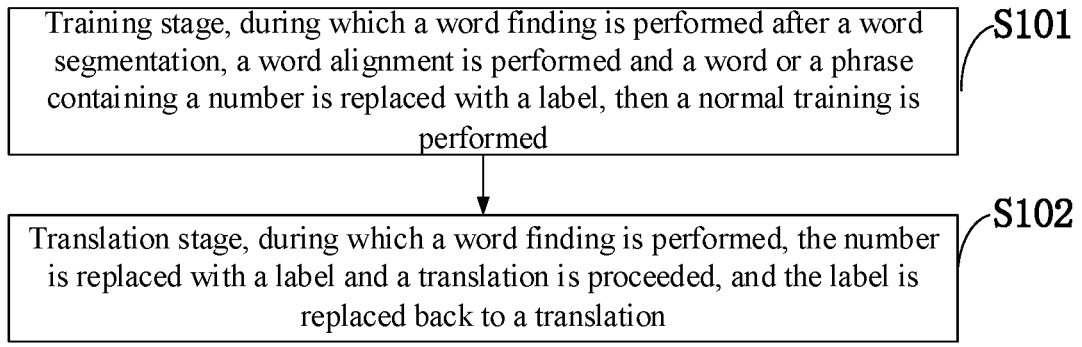
FIG. 1 is a flowchart of a numerical generalization method for machine translation provided by an embodiment of the present invention.

As shown in FIG. 1, the numerical generalization method for machine translation provided by an embodiment of the present invention includes the following stages:

S101: training stage, during which a word finding is performed after a word segmentation, a word alignment is performed and a word or a phrase containing a number is replaced with a label, then a normal training is performed.

S102: translation stage, during which a word finding is performed, the number is replaced with a label and the translation is proceeded, then the label is replaced back to a translation.

Figure 2:
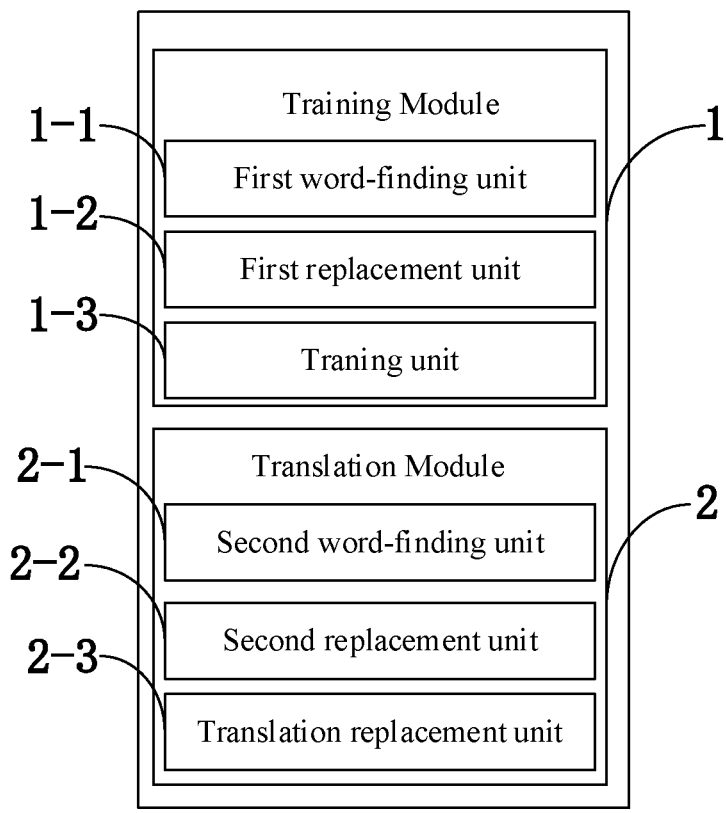
FIG. 2 is a structural schematic diagram of a numerical generalization system for machine translation provided by an embodiment of the present invention.

As shown in FIG. 2, a numerical generalization system for machine translation provided by an embodiment of the present invention includes:

training module 1, configured to process the training corpus in a special manner; and translation module 2, configured to replace a generalization label in a translation with a normal translation.

The training module 1 further includes:

first word-finding unit 1-1, configured to find words or phrases that contain number;

first replacement unit 1-2, configured to provide parallel corpora of the words or phrases that contain the number as a replacement translation for the translation stage; and training unit 1-3, configured to normally train a corpus being processed by replacing a word or a phrase containing a number with a numerical generalization label.

The translation module 2 further includes:

second word-finding unit 2-1, configured to process an original text in a way similar to a processing of the training corpus, and replace the words or phrases that contain the numbers with the generalization labels to have a format consistent with a format of the training corpus;

second replacement unit 2-2, configured to translate a generalized original text; and translation replacement unit 2-3, configured to replace the numerical generalization label in a translation to obtain a normal translation.

The application principle of the present invention will be further described in detail in combination with the embodiment, hereinafter.

The numerical generalization method for machine translation provided by the embodiment of the present invention includes the following stages:

a training stage, in the training stage, a training corpus is processed in a special manner, and a normal training is performed without changing a structure of a neural network model; a translation stage, in the translation stage, a generalization label in a translation is replaced with a normal translation.

The training stage includes: firstly a word finding is performed after a word segmentation, then a word alignment and a replacement of label are performed, lastly a normal training is performed.

The translation stage includes: firstly a word finding is performed after a word segmentation, then the number is replaced with a label and the translation is proceeded, lastly the label is replaced back to a translation.

Furthermore, the training stage specifically includes:

firstly, applying a word segmentation algorithm based on a hidden Markov model on a corpus to perform a normal word segmentation, and finding a word or a phrase containing a number by a regular expression according to different languages; this step mainly aims to find the word or phrase that contains the number and get ready for the word alignment in the next step;

then performing a word alignment by an alignment tool, counting a total frequency of word pairs in a bilingual corpus, finding a corresponding translation of the word or the phrase containing the number, and replacing the corresponding translation with a number label; in this step, the parallel corpora of the word or phrase containing the number can provide a replacement translation for the translation stage finally, normally training a corpus being processed by replacing a word or a phrase containing a number with a numerical generalization label.

Furthermore, the translation stage includes:

firstly, performing the word segmentation on the original text, finding the words or phrases containing numbers by a regular expression, and replacing the numbers with numerical generalization labels. This step is similar to the first step in the training stage; similarly, the original text is processed in a way similar to the processing of the training corpus, and the words or phrases containing numbers are replaced with generalization labels to have a format consistent with the format of the training corpus;

translating a generalized original text by a neural network model trained by a generalized corpus;

after a translation is obtained, finding an original text corresponding to the numerical generalization label in the translation through attention information in the neural network model, and replacing the numerical generalization label with the translation according to word pair information obtained by a tool of the word alignment used in the training stage to obtain a final translation.

The above embodiments may be fully or partially implemented through software, hardware, firmware or any combination thereof. When the embodiments are fully or partially implemented in the form of a computer program product, the computer program product includes one or more computer instructions. When the computer program instructions are loaded or executed on the computer, the process or function described in accordance with the embodiments of the present invention is fully or partially generated. The computer may be a general purpose computer, a special purpose computer, a computer network, or other programmable device. The computer instructions can be stored in a computer readable storage medium, or transmit from a computer readable storage medium to another computer readable storage medium. For example, the computer instructions can be transmitted from a web site, computer, server, or data center through the cable (such as a coaxial cable, optical fiber, digital subscriber line (DSL)) or wireless (such as infrared, radio, microwave, etc.) to another web site, computer, server, or data center. The computer readable storage medium may be any available medium that the computer can access, or a data storage device that contains a server, a data center and the like that is integrated by one or more available medias. The available media may be magnetic media (for example, floppy disk, hard disk, magnetic tape), optical media (for example, DVD), or semiconductor media (for example, Solid State Disk (SSD)).

The foregoing is merely the preferred embodiments of the present invention which are not intended to limit the present invention. Any modification, equivalent substitution and improvement made within the spirit and principles of the present invention shall be considered as falling within the scope of the present invention.

What is claimed is:

1. A numerical generalization method for machine translation comprising:
   a training stage, wherein in the training stage, a training corpus is processed and a normal training using the training corpus is performed without changing a structure of a neural network model; and
   a translation stage, wherein in the translation stage, replacing a numerical generalization label in a translation to obtain a normal translation;
   wherein the training stage comprises:
   applying a word segmentation algorithm based on a hidden Markov model on the training corpus to perform a normal word segmentation, and finding a word or a phrase containing a number by a regular expression according to different languages;
   performing a word alignment, counting a total frequency of word pairs in a bilingual corpus, finding a corresponding translation of the word or the phrase containing the number, and replacing the word or the phrase containing the number with the numerical generalization label;
   a normal training using the bilingual corpus being processed by replacing the word or the phrase containing the number with the numerical generalization label.

2. The numerical generalization method of claim 1, wherein the translation stage comprises:
   replacing a word or a phrase containing a number found by performing the word segmentation on an original text with the numerical generalization label;
   translating a generalized original text by a neural network model trained by a generalized corpus;
   after a translation is obtained, finding an original text corresponding to the numerical generalization label in the translation through attention information in the neural network model, and replacing the numerical generalization label with the translation according to word pair information obtained by a tool of the word alignment used in the training stage to obtain a final translation.

3. A numerical generalization system for performing the numerical generalization method of claim 1 comprising:
   a training module, configured to process a training corpus; and
   a translation module, configured to replace a numerical generalization label in a translation to obtain a normal translation,
   wherein the numerical generalization method comprises:
   a training stage, wherein in the training stage, a training corpus is processed and a normal training using the training corpus is performed without changing a structure of a neural network model; and
   a translation stage, wherein in the translation stage, replacing a numerical generalization label in a translation to obtain a normal translation;
   wherein the training stage comprises:
   applying a word segmentation algorithm based on a hidden Markov model on the training corpus to perform a normal word segmentation, and finding a word or a phrase containing a number by a regular expression according to different languages;
   performing a word alignment, counting a total frequency of word pairs in a bilingual corpus, finding a corresponding translation of the word or the phrase containing the number, and replacing the word or the phrase containing the number with the numerical generalization label;
   a normal training using the bilingual corpus being processed by replacing the word or the phrase containing the number with the numerical generalization label.

4. The numerical generalization system of claim 3, wherein the training module further comprises:
   a first word-finding unit, configured to find a word or a phrase containing a number;
   a first replacement unit, configured to provide parallel corpora of a word or a phrase containing the number as a replacement translation for the translation stage; and
   a training unit, configured to a normal training using the training corpus being processed by replacing the word or the phrase containing the number with the numerical generalization label.

5. The numerical generalization system of claim 3, wherein the translation module further comprises:
- a second word-finding unit, configured to process an original text in a way similar to a processing of the training corpus, and replace a word or a phrase containing a number with the generalization label to have a format consistent with a format of the training corpus;
- a second replacement unit, configured to translate a generalized original text; and
- a translation replacement unit, configured to replace the numerical generalization label in a translation to obtain a normal translation.

6. A computer program stored on non-transitory computer readable storage medium, implementing the numerical generalization method of claim 1.

7. A computer running the computer program stored on non-transitory computer readable storage medium of claim 6.

* * * * *